(No Model.)

F. A. ALLEN.
COFFEE STEAMER.

No. 261,575. Patented July 25, 1882.

WITNESSES.
James T. Dorsey
W. R. Marble

INVENTOR.
Frank A. Allen
By Sylvenus Walker
Attorney

United States Patent Office.

FRANK A. ALLEN, OF CAMBRIDGE, ASSIGNOR TO THE ORIENTAL TEA COMPANY, OF BOSTON, MASSACHUSETTS.

COFFEE-STEAMER.

SPECIFICATION forming part of Letters Patent No. 261,575, dated July 25, 1882.

Application filed March 20, 1882. (No model.)

*To all whom it may concern:*

Be it known that I, FRANK A. ALLEN, of Cambridge, in the county of Middlesex and State of Massachusetts, have invented a new and useful Improvement in Coffee-Steamers, of which the following is a specification.

The objects of my invention are to provide an apparatus or utensils for steeping ground coffee, in the process of extracting the beverage, by percolation of very hot water without boiling, and also preventing the coffee from being soaked in the infusion during the process of extraction or thereafter, so as to obtain all of the fine aroma and flavor without extracting the vegetable flavor, which is objectionable, or other objectionable substances, or dispelling the essential oil and other delicious properties which are carried off by the escape of steam.

My invention is more particularly designed for making coffee in large quantities, as required in hotels, saloons, and similar places, but is equally adapted to common household use; and it consists in the construction and arrangement of a steam-jacket outside of and surrounding the filter and percolating-vessel containing the hot water and coffee being steeped, as hereinafter more fully described, and set forth in the claims.

Figure 1:
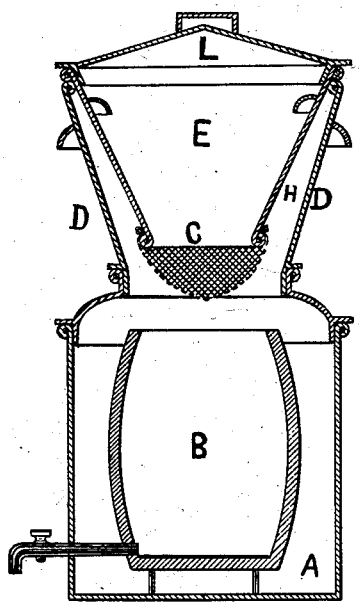
Figure 2:
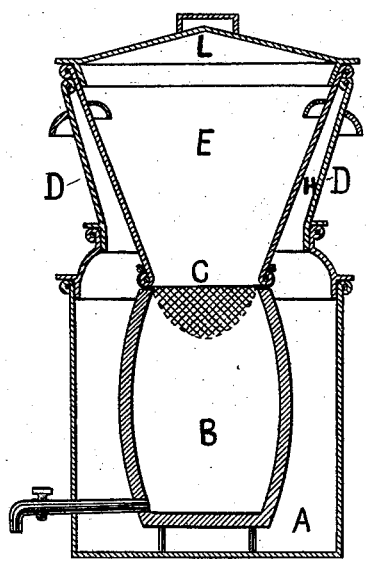

Figure 1 represents a vertical central section of a coffee steaming and steeping apparatus constructed according to my invention. Fig. 2 represents a similar view of a modification of the same.

A represents a boiler, tank, or vessel partially filled with water, which is kept at the boiling-point by steam or in any other desired manner, and within which is placed a porcelain or other desired vessel, B, supported a short distance from the bottom of the boiler or outer vessel, A, and, if desired, may be provided with any suitable means for drawing off or removing the extracted coffee therefrom, which is filtered through the cloth or other strainer, C, secured to the lower end of the cone or other shaped vessel, E, supported at its upper end, or otherwise, so as to retain the said strainer C above the top of the vessel B and within the steam-jacket D, which surrounds the said vessel E, leaving an annular steam-space, H, surrounding the same and connecting with the interior of the boiler A, so that when a sufficient degree of heat is applied to the said boiler to generate steam it arises within the jacket or space H, between it and the said vessel E, so as to keep the hot water placed therein at a high temperature, or as near the boiling-point as may be practicable, while it filters or percolates through the ground coffee previously placed within the said vessel E or its strainer C, and is received within the said coffee-vessel B, which has an open top or mouth to receive it, as shown.

It will be understood that I contemplate supporting the vessel E at its lower end upon the mouth of the vessel B, instead of supporting it as above described and shown in the drawings, the steam-jacket D extending up outside of the said vessel E, substantially the same as described in the former construction, whereby the water placed upon the coffee is kept hot, as shown in Fig. 2. When the hot water has been placed in the vessel E upon the ground coffee a cover, L, is placed upon the mouth of the vessel, so as to retain the steam and aroma arising from the same during such process of steeping and percolation, which usually requires from twenty to thirty minutes, more or less.

For convenience of filling and emptying the several vessels or utensils described they may be provided with suitable handles, covers, flanges, and devices to temporarily connect the same together, as shown, or may be modified as occasion may require without departing from the essential features of my invention.

I have shown a faucet or common stop-cock inserted through the boiler A and entering the vessel B near its bottom for the purpose of drawing therefrom the extracted beverage; but it may be removed by a pump, or in any other manner most convenient; or the same may be removed by first removing the vessel E and steam-jacket D from the cover N or top of the boiler A and then removing the beverage, or removing the top portion, N, of the boiler A and then removing the vessel B therefrom; and as the coffee extract or beverage contained in the said inner vessel, B, cannot be raised to the degree of heat required to make it boil, thereby the essential oil and aroma and delicious flavors are all retained in the pure, clear coffee extract or beverage, as desired.

I am aware that heretofore coffee-pots and devices for making coffee have been provided with hot-water jackets surrounding the coffee-vessel, so as to keep the beverage hot after its extraction; and, also, I am aware that steam has been admitted to the strainer-vessel containing ground coffee for the purpose of extracting the coffee-beverage, and that it is common to add hot water to the ground coffee and permit it to filter through the same; but such devices, intended for such purposes, would not serve the objects accomplished by my invention. Therefore I disclaim the same.

Having thus described my invention, what I claim is—

1. The coffee-steamer consisting of the boiler A and inclosed coffee-vessel B, provided with the elevated steam-jacket D, and conical steeping-vessel E, provided with the strainer C, whereby the extracting-liquid may be kept hot in said steeping-vessel while the beverage percolates into the said coffee-vessel beneath, substantially as described, as and for the purposes set forth.

2. The combination, with the boiler A, having the inclosed coffee-vessel B, of the elevated conical steeping-vessel E, provided with a strainer, C, and cover L, and steam-jacket D, extending from the top of the boiler and surrounding the sides of the said steeping-vessel, substantially as shown and described, as and for the purposes set forth.

FRANK A. ALLEN.

Witnesses:
SYLVENUS WALKER,
WM. H. NORTH.